April 23, 1935. R. J. S. PIGOTT ET AL 1,998,996
BOTTOM HOLE PRESSURE BOMB
Filed Nov. 29, 1932 2 Sheets-Sheet 1

Inventors
Reginald J. S. Pigott
George W. Rusler
A. M. Houghton
Attorney

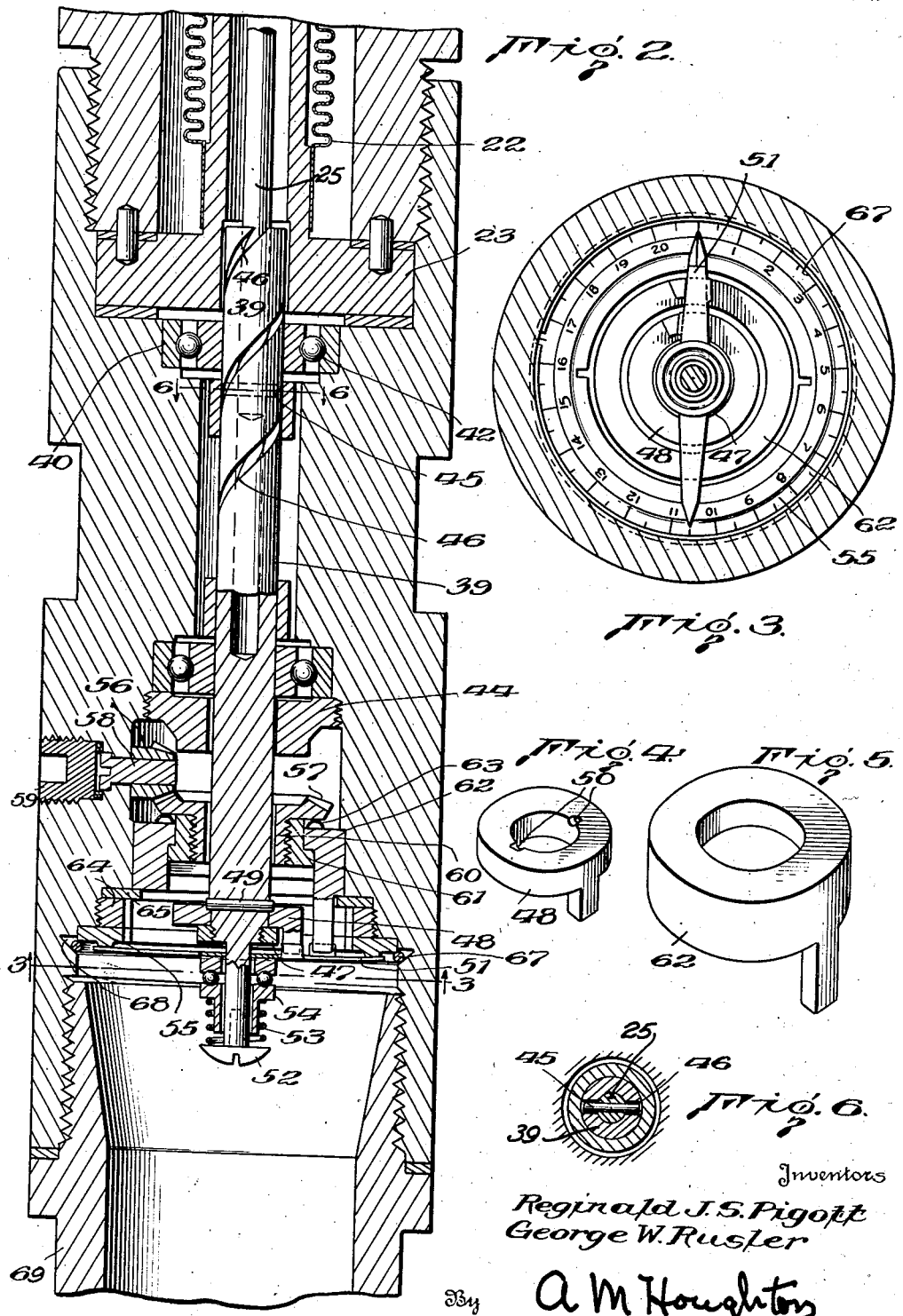

Patented Apr. 23, 1935

1,998,996

UNITED STATES PATENT OFFICE 1,998,996

BOTTOM HOLE PRESSURE BOMB

Reginald J. S. Pigott and George W. Rusler, Pittsburgh, Pa., assignors, by mesne assignments, to Gulf Research & Development Corporation, Pittsburgh, Pa., a corporation of Delaware Application November 29, 1932, Serial No. 644,860

11 Claims. (Cl. 73—5)

This invention relates to bottom hole pressure bombs; and it comprises a tubular casing divided into a plurality of separate and distinct compartments, one of the compartments being adapted to receive a fluid under a pressure to be measured and containing a pressure responsive element such as a bellows, the interior of the bellows communicating with a second compartment, a second pressure responsive element or bellows in the second compartment, the interior of the second bellows communicating with a third compartment, the third compartment being sealed at atmospheric pressure and means actuated by the second pressure responsive element for moving a pressure indicating hand, and it further comprises a spring arranged to restrain compression of the second bellows, a maximum indicator hand and means for setting the hand at zero after a pressure reading has been made; all as more fully hereinafter set forth and as claimed.

In the operation of oil wells it is of importance to know the pressure at the bottom of the well and the relation of this pressure to the pressure within the producing formation. These pressures must be known in order to operate the well efficiently. For example, when these pressures are known it is possible to determine whether the rate of production obtained from a well is limited by the capacity of the method of lifting the oil or by the capacity of the well to produce. The best size of flow tubing for a well flowing naturally or by gas lift may also be determined as may many other numerical factors of importance in the lifting and recovery of oil. The value of such calculation depends entirely upon the degree of accuracy with which the bottom hole pressure has been determined. This pressure forms the basis from which all other calculations are made. For a further consideration of the value and importance in determining the bottom hole pressures in oil wells reference is made to an article "Bottom hole pressures in oil wells", by C. V. Millikan and Carroll V. Sidwell appearing in the Transactions of the American Institute of Mining and Metallurgical Engineers, Petroleum Development and Technology, 1931.

Bottom hole pressures of an inactive well may be calculated from the pressure of the fluid head of the well. From a flowing well it may be calculated by adding the pressure at the casing head obtaining between the tubing and the casing and the pressure due to the weight of the column of fluid in the tube, but there is always a possibility of error caused by fluid being in the annular space above the bottom of the tubing. Accurate results are best obtained by a pressure gauge inserted in the well. For this purpose several different types of gauges have been designed. Many operate on the principle of the Bourdon type while others use a piston and spring or a fluid filled tube with elastic walls. All are of delicate and intricate construction, expensive to manufacture and require frequent repair. The provision of an accurate gauge of simple, rugged construction, and inexpensive in manufacture, is a desideratum in the art to which this invention relates.

In accordance with the present invention there is provided a pressure gauge of tubular construction having three separate compartments. In each of two of these compartments is arranged a pressure responsive bellows having one of its ends fixed and the other end free and movable. One of the compartments is adapted to receive the fluid the pressure of which is to be measured. The interior of the bellows in this compartment communicates with the space surrounding the bellows in the second compartment. The interior of the bellows in the second compartment communicates with the third compartment containing the indicating mechanism of the gauge and this latter compartment is sealed at atmospheric pressure. The indicating mechanism is arranged to be actuated by the bellows in the second chamber. For this purpose a movement post or reciprocating member carried by the free end of the bellows is arranged to rotate a shaft carrying a dog. The dog in turn engages a maximum reading indicator hand to move it in a clockwise or increasing pressure direction. This operation of the movement post by the bellows is restrained by a spring secured to the free end of the bellows and to a stationary part of the gauge body. The action of the spring and bellows is such that equal increments of pressure upon the bellows produce equal reciprocatory movements of the movement post and corresponding equal movements of the indicating hand. The indicator hand is frictionally held in the position to which it is moved by a light spring so that the gauge indicates the maximum pressure existing in the well, and records the pressure until the hand is reset. To reset the hand at zero a second dog is provided and operated through a pair of beveled gears by removing a plug in the side of the casing of the gauge and inserting a screw driver or the like in the notched end of the shaft carrying one of the gears. The position of the indicator hand is ascertained by removing the bullet shaped lower end of the gauge and looking through a glass window which seals that end of the dial chamber from the rest of the gauge. In the accompanying drawings wherein we have illustrated one form of a specific embodiment of our invention:

Fig. 1, in three parts, is a longitudinal section through the gauge and shows the arrangement and operation of the working parts;

Fig. 2 is an enlarged detail sectional view of the indicator hand operating mechanism shown in the portion II of Fig. 1;

Fig. 3 is a transverse sectional view taken along line 3—3 of Fig. 2 and shows the dial and the indicator hand of the gauge;

Figs. 4 and 5 are detail perspective views of the indicator hand operating dogs respectively; and Fig. 6 is a detail sectional view taken along line 6—6 of Fig. 2 and shows the driving pin connection between the movement post and the indicating hand operating shaft.

Figure 1:
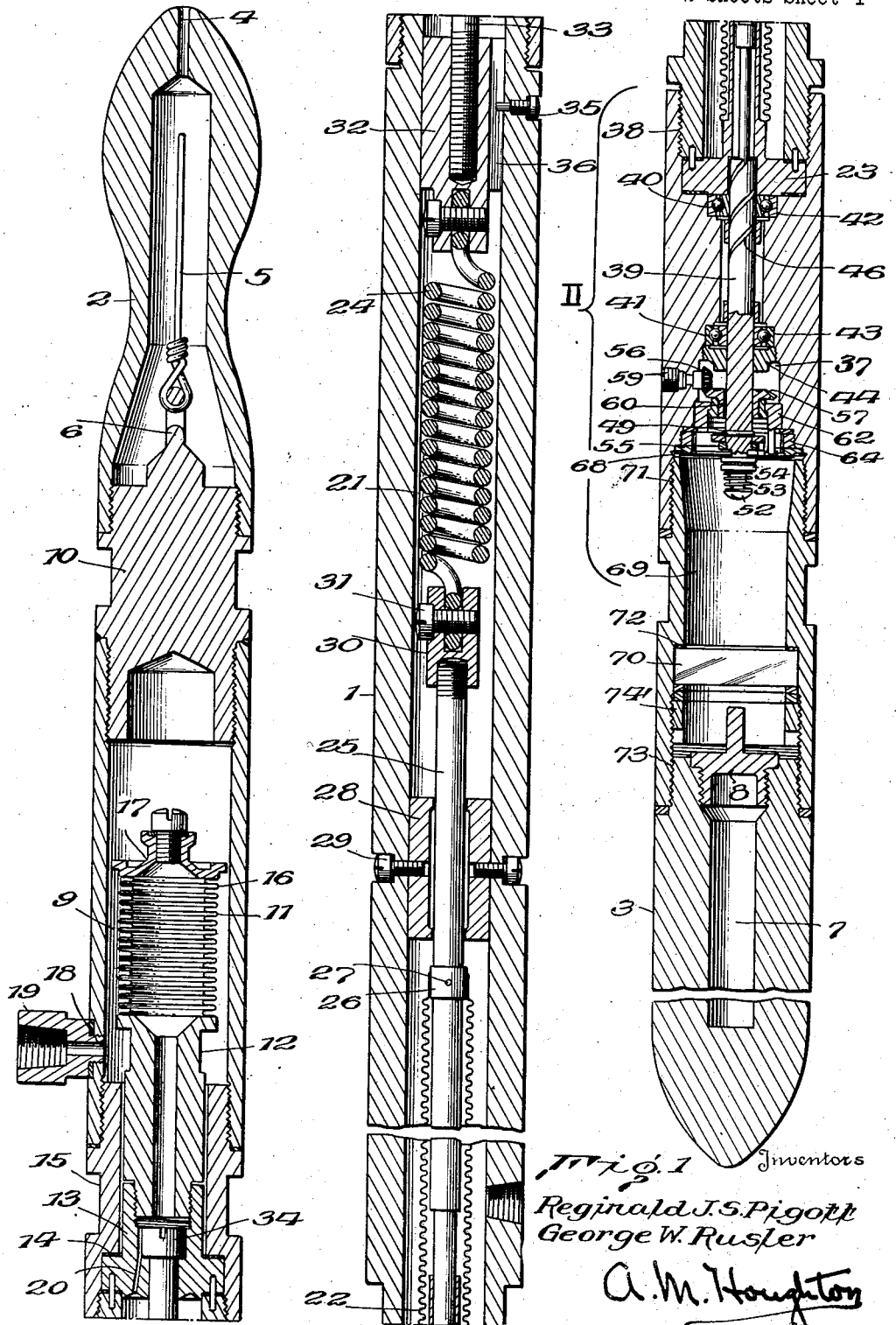

Referring to the drawings throughout the several views of which like numerals indicate corresponding parts, numeral 1 represents generally the body of the gauge while numerals 2 and 3 indicate the upper and lower ends of the gauge respectively. The upper end 2 of the gauge is shaped to form a handle and is provided with an opening 4 through which passes a cable 5. Inside the handle the cable is securely fastened to an eyelet 6 by means of which the gauge is lowered and raised in the well. The lower end 3 of the gauge is bullet shaped and provided with a hollow portion or chamber 7 in which a maximum reading thermometer of usual form is placed, to take maximum temperature simultaneously with maximum pressure readings. A screw cap 8 separates this chamber from the chamber containing the indicator hand operating mechanism (hereafter described). The body portion of the gauge consists of three main sections or non-communicating chambers joined end to end by suitable couplings. The uppermost of these sections, chamber 9, joins the handle 2 through solid coupling or connector 10 and contains a pressure responsive bellows 11. The lower end of this auxiliary bellows is fixed against movement and secured to a nipple 12 having threaded connection with a flanged collar 13 which is held in position against an internal shoulder 14 on connector or coupling 15. Coupling 15 is threaded to the lower end of chamber 9 and seals the same from the adjacent chamber 21. The free end 16 of the bellows 11 is closed by a cap 17 fitting loosely in chamber 9 in order that fluid may pass between it and the inner walls of the chamber to act on the top of the bellows as well as upon its sides. Chamber 9 is provided with a small threaded opening 18 for admission of the fluid, the pressure of which is to be determined. For purposes of testing or calibrating the gauge a small pipe coupling 19 may be screwed into this opening and the chamber connected in parallel with a standard test gauge. The interior of the bellows 11 communicates through nipple 12 and bleeds 20 in flanged collar 13 with the interior of the second section or chamber 21 of the gauge. In this chamber there is also a bellows 22 having one end secured to a flanged nipple 23 and its other end secured through a spring 24 to a stationary portion of the gauge. The purpose of the spring is to restrain the movement of the free end of the bellows. The spring, indicated by numeral 24 is secured to the bellows through a draw bar 25. For this purpose a collar 26 pinned to the bar by pin 27 is arranged to receive the end of the bellows, preferably by welding the bellows thereto, hermetically sealing the end thereof. Guides 28 are secured to the casing of the gauge by means of counter-sunk machine screws 29. The guides maintain straight, lineal reciprocation of the bellows and spring and prevent them from jamming against the sides of the gauge. The spring 24 is secured to the end of the draw bar through a yoke shaped member 30 and bolt 31 which passes through the eye of the spring. The other end of the spring is secured in a similar manner to a plug member 32 held rigidly in axial position by bolt 33, the head 34 of which is seated in stationary flanged collar 13. The tension of the spring may be adjusted by means of the bolt 33, so as to adapt the gauge for use with pressures of greater or less magnitudes. In the showing, the spring is shown in its full tension position. To prevent the plug 32 from turning, there is provided a set screw 35 countersunk in the casing of the gauge engaging with passage 36 which acts as a key-way for this purpose. Passageway 36 in member 32 permits ready communication of the fluid in bellows 11 with the interior of chamber 21. Bellows 11 is not an essential part of the pressure measuring system, but is interposed between chamber 9, and the measuring bellows 22, to prevent access to bellows 22 of any corrosive fluids such as salt water or sulfurous liquid in the well water. The volume enclosed between auxiliary bellows 11 and measuring bellows 22 is completely filled with clean, neutral fluid, such as transformer oil, so that no corrosion can affect the natural stiffness of bellows 22 by reduction of material thickness, or otherwise injure it. If the fluid in the well is known to be non-corrosive, auxiliary bellows 11 can be omitted, and pressure can be applied direct to measuring bellows 22. Auxiliary bellows 11 is made of thin material and large diameter for extreme flexibility as it is subject to almost no difference of pressure; it has therefore an indistinguishable effect upon the pressure readings, and may be considerably corroded without effect upon the pressure readings. Bellows 22, being hermetically sealed at the free end by soldering or welding to collar 26, and open at the other end, is adapted to compress as pressure is externally applied by the fluids in the well, through auxiliary bellows 11, and the liquid between 11 and 22, thus transmitting axial motion to draw-bar or movement post 25. Chamber 37 of the gauge containing the pressure indicating mechanism is fastened to chamber 21 through threaded portion 38, flange nipple 23 to which the fixed end of the bellows 22 is secured fitting between the ends of the two sections as shown. Draw-bar 25 extends through bellows 22 and into the hollow end of shaft 39. This shaft is adapted to rotate to turn the indicating hand of the gauge and is supported in suitable bearings such as ball bearings 40 and 41. Bearing 40 is held in recess 42 by means of flanged nipple 23 and bearing 41 is held in recess 43 by means of threaded retaining nut 44. Suitable drive connection is provided between draw-bar 25 and shaft 39 and this may consist of a transverse pin 45 (Fig. 2) in bar 25 engaging a helical slot or groove 46 in shaft 39. Mounted near the end of shaft 39 and secured thereto by nut 47 is a dog 48 shown in detail in Fig. 4. The dog is keyed to the shaft by a pin 49 engaging recesses 50 in the rear face of the dog. Mounted on the end of the shaft and adapted to turn freely thereon is an indicator hand 51 which is held in position by means of screw 52, coil spring 53 and thrust bearing 54. The light coil spring 53 forces the ends of the indicator hand against an upstanding annular portion of the graduated dial 55 of the gauge as shown. The indicator hand is thus frictionally held in any position to which it may be moved. Since dog 48 rotates the indicator hand in only one direction it is necessary that suitable means be provided for resetting the hand to zero after a reading has been taken. For this purpose a pair of beveled gears 56 and 57 is provided, adapted to be actuated manually by a screw driver or suitable wrench or key from the outside of the casing. Gear 56 is keyed to shaft 58 which is held in position in a recess of the side wall of the gauge. This shaft is adapted to be rotated by suitable means such as a screw driver, etc. and access to the same is gained by removing screw plug 59. Gear 57 is provided with an extended hub portion 60 threaded externally to receive a flanged collar 61. Positioned between the flange on the collar and the rear face of the gear is a second dog 62 held in frictional engagement with the gear by an annular spring 63. This dog is arranged for abutting engagement with the opposite side of the indicator hand to rotate it in the reverse direction. Gear 57 is held in engagement with gear 56 by means of retaining nut 64 and washer 65. The dial 55 of the gauge is held in position by means of a locking ring 67 which seats in annular recess 68 in the body of the gauge. Connecting the section of the gauge containing the pressure indicating mechanism with the end of the bomb is a short section 69 provided with a glass window 70. This section screws into section 37 as shown at 71 and is adapted to receive the bullet shaped end 3 of the gauge as shown at 73. Section 69 encloses a chamber communicating through chamber 37 with the interior of bellows 22. Window 70 is suitably held in position against shoulder 72 by retaining nut 74. To read the gauge it is necessary to remove the end 3, at which time the position of the indicator hand on the dial may be viewed through the glass window.

The gauge is operated as follows:

Lower end 3 is removed in order to view the position of the indicator hand. If necessary plug 59 is also removed and the hand set to zero by means of a screw driver or the like inserted in the slotted end of shaft 58. Rotation of shaft 58 turns gear 56 and gear 57 being in frictional engagement through spring 63 with dog 62, turns dog 62. Dog 62 is thus brought into engagement with indicator hand 51 to set the same at zero. The plug 59 and the ends of the gauge are then replaced and the gauge lowered by means of cable 5 to the bottom of the well. The fluid in the well enters chamber 9 of the bomb through opening 18 and exerts its pressure to compress the bellows 11. This forces a portion of the fluid in bellows 11 into chamber 21 where it compresses bellows 22. The compression of bellows 22 is directly restrained by spring 24 secured to the bellows through draw bar 25 while the compression of bellows 11 is restrained only indirectly by the spring acting through the medium of the fluid in chamber 21 and bellows 11. When bellows 22 is compressed it carries with it draw bar 25, which, acting through pin 45, rotates shaft 39 carrying dog 48 keyed thereto. The mechanism described serves to impart a rotary movement to the dog, the extent of movement reflecting the pressure of the fluid in the well. Dog 48 engages indicator hand 51 to move it to the position determined by the pressure in the well. The gauge is then withdrawn from the well. During the period of withdrawal the fluid which entered chamber 9 under pressure at the bottom of the well, now discharges itself from the chamber through the same opening that it entered, that is opening 18, and the pressure in chamber 9 is reduced to normal. With the pressure reduced in chamber 9, spring 24 expands bellows 22, forcing fluid out of chamber 21 and back into bellows 11 to expand bellows 11 to its normal position. Upon the expansion of bellows 22, draw bar 25 rotates shaft 39 in the reverse direction to release dog 48 from the indicator hand and return the dog to its normal or starting position. Meanwhile, indicator hand 51, due to its frictional engagement with the annular upstanding portion of the dial 55 of the gauge, remains in the position to which it was moved by dog 48. After withdrawing the gauge from the well the bullet shaped end 3 is detached and the position of the indicator hand read through glass window 70, which may be a magnifying glass. The hand may then be reset as before and the gauge is then ready for reuse.

Suitable gaskets are provided throughout the joints of the gauge to maintain the various chambers of the gauge in sealed relation to each other. Pins are used, as shown, between flanged collar 13 and the upper threaded end of chamber 21; between the flanged collar 23 and the lower threaded end of chamber 21. This is to prevent rotation of the collars with respect to the chamber when the gauge is put together.

With the construction set forth all of the working parts of the gauge with the exception of bellows 11 in chamber 9 are protected from contact with any of the dirt or liquid material from the well.

It is important to note that chambers 37 and 69 of the gauge which communicate with the interior of bellows 22 must contain only that air naturally present at the atmospheric pressure existing at the surface level. Therefore, all joints between the chambers must be absolutely tight.

The gauge herein described is simple in operation and construction, is cheap to manufacture and rugged and accurate in use. The gauge does not get out of order easily and requires no particular care in handling.

What we claim is:

1. A bottom hole pressure gauge comprising a tubular casing adapted to be lowered to the bottom of a well, said casing being divided into three separate and distinct compartments, one of said compartments being open to the atmosphere and containing a pressure responsive bellows, the interior of said bellows communicating with the interior of said second compartment, a second bellows in said second compartment and sealed from the second compartment, a body of liquid filling the space comprising the interior of the first pressure responsive bellows and the second compartment, the interior of said second bellows communicating with the interior of said third compartment, said third compartment being sealed at atmospheric pressure, a maximum pressure indicating hand in said third compartment, and means actuated by said second bellows for moving the maximum pressure indicating hand.

2. In a bottom hole bomb type of pressure gauge, a pressure responsive bellows arranged for free communication with the fluid whose pressure is to be determined, a second, air filled bellows, the space surrounding this second bellows being in communication with the interior of the first bellows, an air chamber in open communication with the interior of the second bellows, the amount of air in the air chamber and the interior of the second bellows remaining at all times the same amount as at atmospheric pressure, a pressure indicating hand in the air chamber, and means actuated by the second bellows for moving the indicating hand.

3. A bottom hole, bomb type of pressure gauge comprising a long cylindrical casing adapted to be lowered to a point at which pressure is to be measured, said casing being divided into a plurality of separate and distinct compartments, one of said compartments being open to the atmosphere and containing a pressure responsive bellows, the interior of said bellows communicating with a second compartment, a body of liquid filling the interior of the first bellows and the second compartment, a second bellows in the second compartment, the interior of said second bellows communicating with a third compartment, said third compartment being sealed at atmospheric pressure and containing a maximum pressure indicating hand, a spring for retaining the compression of said second bellows, means actuated by said second bellows for moving said maximum indicator hand and means for manually resetting said indicator hand to zero.

4. In a bottom hole, bomb type of pressure gauge, a pressure responsive bellows having a fixed end and a movable end, spring means restraining motion of the movable end, a movement post carried by said movable end, a driving shaft, mechanical means on said movement post engaging the driving shaft and being adapted for reversibly rotating said shaft, a dog keyed to said driving shaft, an indicator hand adapted to be engaged by said dog for rotation of said hand in one direction only, means for frictionally holding said hand in the position to which it is rotated and means for manually resetting said hand to zero.

5. Apparatus for measuring bottom hole pressures in oil wells or the like comprising a relatively long tubular casing, a pressure responsive bellows in said casing, spring means restraining motion of the bellows, a chamber in said casing sealed at atmospheric pressure and communicating with the interior of said bellows, said sealed chamber containing the indicating mechanism of the gauge, a movement post adapted for reciprocation by said bellows, a driving shaft and cam mechanism adapting the shaft to be reversibly rotated by said movement post, a dog keyed to said driving shaft, a maximum indicator hand adapted to be moved in one direction only by said dog and means for manually resetting said indicator hand to zero.

6. In apparatus for measuring bottom hole pressures in oil wells or the like, comprising a relatively long tubular casing adapted to be lowered to the bottom of a well, a pair of chambers in said casing, one of said chambers being sealed at atmospheric pressure and containing the indicating mechanism of the gauge, the other of said chambers containing a pressure responsive bellows, the interior of said bellows being in communication with said first mentioned chamber, a movement post carried by said bellows and adapted for reciprocating movement, a driving shaft, means for rotating this shaft operable by the reciprocatory movement of said movement post, a dog keyed to said driving shaft and a maximum indicator hand adapted to be moved by said dog to indicate maximum pressures in the well.

7. In a fluid pressure gauge for measuring bottom hole pressures in oil wells and the like, a casing having a plurality of chambers, a bellows in one of said chambers adapted to respond directly to pressure of the fluid being tested, a second bellows in another of the chambers, pressure indicating mechanism operable by the second bellows, a body of liquid in the casing adapted to transmit movement of the first named to the second named bellows, and a dividing element in the casing between the two bellows having a constricted orifice adapted to restrict flow of the liquid so as to prevent sudden variations in pressure affecting the first named bellows from directly affecting the second named bellows and hence the indicating mechanism.

8. A bottom hole bomb type of pressure gauge comprising a tubular casing, a plurality of separate and distinct compartments in said tubular casing, one of said compartments being adapted to be put in communication with fluid the pressure of which is to be measured, means in said compartment responsive to hydraulic pressure of the fluid, a second pressure responsive means in a second compartment adapted to be hydraulically actuated by said first pressure responsive means, a pressure indicating hand in a third compartment in said casing and mechanical means actuated by said second pressure responsive means for mechanically operating said pressure indicating hand.

9. In a fluid pressure gauge for measuring bottom hole pressures in oil wells and the like, a casing, pressure responsive means in the casing in direct contact with the fluid the pressure of which is to be measured, a body of liquid in the casing, a second pressure responsive means adapted to be hydraulically actuated by said first mentioned pressure responsive means through the medium of the body of liquid, mechanical means actuated by said second pressure responsive means and adapted to produce a movement corresponding to the pressure of said fluid, and indicating means actuated by said mechanical means and adapted to indicate the maximum pressure to which the gauge is subjected in the well.

10. A bottom hole pressure gauge comprising a tubular casing adapted to be lowered to the bottom of a well, a soft bellows in said casing adapted for direct contact with fluid whose pressure is to be determined and adapted to respond to pressure directly, a second bellows in the casing, a body of liquid in the casing adapted to transmit pressure-responsive motion from the first to the second bellows, spring means restraining the action of this bellows, a maximum pressure indicating hand, and means operatively connecting the second bellows with the pressure indicating hand.

11. A bottom hole pressure gauge comprising a tubular casing adapted to be lowered to the bottom of a well, a soft, readily movable bellows in said casing adapted for direct contact with fluid whose pressure is to be determined and adapted to respond to pressure directly, a second bellows in the casing, a body of liquid in the casing adapted to transmit pressure responsive motion from the first to the second bellows, a reciprocating member actuated by the second bellows, coil spring means restraining the action of the second bellows, the arrangement being such that equal increments of pressure produce equal movements of the reciprocating member, and indicating mechanism in the casing operatively connected to the reciprocating member.

REGINALD J. S. PIGOTT.
GEORGE W. RUSLER.